United States Patent
Prilutsky et al.

(10) Patent No.: US 6,743,746 B1
(45) Date of Patent: Jun. 1, 2004

(54) CATALYST FOR THE LOW-TEMPERATURE PYROLYSIS OF HYDROCARBON-CONTAINING POLYMER MATERIALS

(75) Inventors: Emmanuil Volfovich Prilutsky, Kiev (UA); Oleg Volfovich Prilutsky, Kibuz Ruhama (IL)

(73) Assignee: Oy Altimeco LTD, Espoo (FI)

( * ) Notice: Subject to any disclaimer, the term of this patent is extended or adjusted under 35 U.S.C. 154(b) by 0 days.

(21) Appl. No.: 10/069,241

(22) PCT Filed: Aug. 25, 1999

(86) PCT No.: PCT/UA99/00017

§ 371 (c)(1),
(2), (4) Date: May 24, 2002

(87) PCT Pub. No.: WO00/15403

PCT Pub. Date: Mar. 23, 2000

(51) Int. Cl.$^7$ ............................ B01J 21/18; B01J 23/40; B01J 23/74

(52) U.S. Cl. ...................................................... 502/185

(58) Field of Search ......................................... 502/185

(56) References Cited

U.S. PATENT DOCUMENTS

| | | | |
|---|---|---|---|
| 1,607,291 A | 11/1926 | Marie | |
| 2,447,732 A | 8/1948 | Campbell et al. | 260/718 |
| 3,996,022 A | 12/1976 | Larsen | 44/1 |
| 4,251,500 A | 2/1981 | Morita et al. | 423/449 |
| 4,656,153 A * | 4/1987 | Wennerberg | 502/182 |
| 4,740,270 A | 4/1988 | Roy | 201/35 |
| 5,096,570 A * | 3/1992 | Utz et al. | 208/423 |
| 5,286,374 A | 2/1994 | Chen | 298/400 |
| 5,385,307 A | 1/1995 | Azar | 241/41 |
| 5,998,328 A * | 12/1999 | Dawes et al. | 502/182 |
| 6,465,390 B1 * | 10/2002 | Hakata et al. | 502/182 |
| 2003/0104936 A1 * | 6/2003 | Mao et al. | 502/339 |

FOREIGN PATENT DOCUMENTS

| | | | |
|---|---|---|---|
| DE | 29 00 655 A1 | 7/1980 | |
| DE | 39 11 082 A1 | 10/1990 | |
| EP | 0 478 774 A1 | 4/1992 | |
| EP | 0 535 253 B1 | 3/1995 | |
| EP | 0 612 828 B1 | 9/1998 | |
| EP | 0 863 197 A1 | 9/1998 | |
| EP | 1238770 A2 * | 9/2002 | ............ B29B/7/00 |
| JP | 52-125088 | 10/1977 | |
| SU | 1698258 A1 | 12/1991 | |
| UA | 10442 A | 12/1996 | |
| WO | 97/44171 | 11/1997 | |

OTHER PUBLICATIONS

*Scrap Tire Technology and Markets*, U.S. Environmental Protection Agency, Pacific Environmental Services, Pollution Technology Review No. 122, pp. 3–4, 51, 77, and 121–126, no month/date.

*Scrap Tire Technology and Markets*, U.S. Environmental Protection Agency, Pacific Environmental Services, Pollution Technology Review No. 122, pp. 40–41, no month/date.

* cited by examiner

*Primary Examiner*—Mark L. Bell
*Assistant Examiner*—Patricia L. Hailey
(74) *Attorney, Agent, or Firm*—Young & Thompson

(57) ABSTRACT

A catalyst used in the low-temperature pyrolysis of hydrocarbon-containing polymer materials, and being mainly intended for use in the recycling of rubber waste materials. The catalyst is prepared from a carbon-iron component in the form of microscopic carbon particles and ultra-dispersed iron particles. In order to increase the yield of light hydrocarbon fractions in the condensate and to bind substantially completely the sulphur in the products of the rubber pyrolysis, the catalyst further contains a metal-carbon component. This component consists of the product from the stripping and the pyrolysis of a dispersion that comprises at least one salt of a metal from the group VIII in the periodic table which is capable of decay upon heating in order to form an oxide, wherein the metal is selected from the group comprising iron, nickel and cobalt. The dispersion further includes a carbohydrate as well as a highly volatile solvent.

9 Claims, No Drawings

CATALYST FOR THE LOW-TEMPERATURE PYROLYSIS OF HYDROCARBON-CONTAINING POLYMER MATERIALS

CROSS REFERENCE TO RELATED APPLICATION

This is the 35 USC 371 national stage of International Application PCT/UA99/00017 filed on 25 Aug. 1999, which designated the United States of America.

FIELD OF THE INVENTION

The present invention relates to both the qualitative and quantitative composition of catalysts for the low-temperature pyrolysis of hydrocarbon-containing polymer materials, said catalysts being mainly intended for use in the recycling of waste rubber materials.

BACKGROUND OF THE INVENTION

Hereinafter:

The term of "hydrocarbon-containing polymer materials", as used herein, refers preferably to composition materials capable of swelling in organic solvents, which contain the binders produced by either polymerization or co-polymerization of alkenes, alkadienes, alkatriens, cycloalkenes, cycloalkadienes and cycloalkatriens and/or derivatives thereof, both alone and with a use of cross-linking agents, and usually not-readily-removable extenders, but preferably to compounded rubber based on vulcanized natural and/or synthetic rubber.

The term of "waste rubber materials", as used herein, refers to worn mechanical rubber articles irrespective of their design, initial sizes and designation.

It is evident for those skilled in the art that waste rubber materials are the most routine form of hydrocarbon-containing polymer materials. Therefore, all that which will be said hereinafter about waste rubber materials might be attributed to other hydrocarbon-containing polymer materials capable of swelling in organic solvents. It as also evident for specialists that used tires of vehicles and, especially, metal-cord tires are presently the principal source of waste rubber materials. Therefore, all that which will be said hereinafter about waste rubber materials of used tires might be attributed to other waste rubber.

It is generally known that waste rubber materials can serve as a source of valuable recycled resources. However, their recovery is impeded by high strength of chemical bonds in macromolecules of vulcanized rubber and by difficulties of rubber separation from reinforcing steel usually present in mechanical rubber articles. In addition, most of the known methods and means for rubber destruction are dangerous because of the environmental contamination with sulfur compounds, carcinogenic carbon black and certain other toxic substances.

It is also generally known that used tires and, especially, metal-cord tires are one of the most serious contaminant of the environment even in the non-recycled form. Thus, 250 million tires are only worn annually in US during the recent 10 years, and their total number dumped has exceeded 3 milliards. Therefore, the problem of worn tires utilization is the more acute, the more economically developed is a country and the less is its territory.

As applied to tires with textile cord, whose mechanical crushing and grinding is acceptable both energetically and ecologically, the indicated problem has been and is being solved by means of:

- either the mechanical separation of crushed tires into rubber crumbs and cellulose-containing fiber materials, and their separate utilization (see, for example, U.S. Pat. No. 1,607,291),
- or the rubber depolymerization, for example in a steam pressurized autoclave (U.S. Pat. No. 2,447,732) or using an apparatus for pyrolysis under vacuum (U.S. Pat. No. 4,740,270), etc.

As applied to worn metal-cord tires, purely mechanical crushing of said tires and grinding of their fragments at the ambient temperature is disadvantageous energetically.

Not long ago, in a number of countries, the problem of such tires disposal has been partly solved by a way extremely dangerous ecologically, i.e. by combustion (see, for example, the paper "Tire Recycling Plant Tire Up" in Modern Tire Dealer, 1987, No.8, p. 6). At that, metal cord was turn into rust of indefinite composition, which was practically nonrecoverable because of substantial cost of the collection, delivery and preparation to introduce them into the metallurgical process.

The shortcomings indicated have been excluded in the processes that provide for staged mechanical grinding of worn tires with at least single freezing.

Thus, the processes are known that include the trimming of tire beads, preliminary crushing of the trimmed tires into fragments, usually of about 3 cm in thickness, and:

- either the milling of fragments at the ambient temperature, magnetic separation of metal, sieve fractionation of rubber particles with the isolation of (1) commercial fine crumbs and (2) grains with linear sizes of preferably 2 to 7 (and no more than 15) mm, which are frozen in liquid nitrogen and then further milled to obtain rubber crumbs with linear sizes of 0,2 to 2,0 mm ("Gummibereitung", 1987, Bd.63, No.10, S.102–104);
- or the freezing of rubber fragments prior to their milling ("Gummibereitung", 1987, Bd.63, No.10, S.97–100; U.S. Pat. No. 5,385,307) with the subsequent separation of metal and fractionation of rubber particles by size.

At that, ecological safety and high quality of the target products of, tire disposal are reached at the expense of low production rate and high specific power inputs. Therefore, the practical use of such processes is limited.

The thermal-electric separation of metal cord from rubber, according to the application DE 2900655, requires for preliminary trimming of tire beads and is only efficacious when cord wires pierce rubber all the way through, from bead to bead. Otherwise, neither warming of entire metal-cord mass up to the temperature of thermal rubber destruction, nor burning-out of all its layers adjacent to cord wires is possible. In addition, the method indicated results in discharge into the air of toxic rubber destruction products.

The induction warming of metal cord (see, for example, the application DE 3911082; the application EP 0 478 774) eliminates the need for trimming beads; however, it increases an output of toxic rubber destruction products.

The electropulse destruction of cord wire (RU Patent 2050287) is based on discharging either a capacitor battery or an accumulation reactive LC-circuit on the metal cord. This process is characterized by a short-term heat emission with a high density of heat rating along boundaries of crystal grains of the metal and, consequently, by the bursting nature of cord wire destruction. At that, a considerable part of fine metal particles fly out of rubber tearing it to fragments of different sizes.

Being ecologically safe, this process does not ensure the efficacious separation of metal and rubber irrespective of the power applied to metal cord, and its practical use is hampered by the following circumstances:

firstly, because of unevenly trimmed beads and/or the above indicated position of a considerable part of cord wires within rubber thickness, effective contact not always can be ensured between a capacitor battery and metal cord with the resulting incomplete destruction of cord wires, not to mention the release of all metal particles out of rubber thickness;

secondly, the electromagnetic (transforming) transfer of power from a reactive LC-circuit to cord wires is the less effective, the more is mass (and inductivity) of the metal cord enclosed in a disintegrating tire.

The efficacious, from the point of purity of the products obtained, and ecologically safe separation of rubber and metal cord during the destruction of integral worn tires of any dimension-types is possible in principle with the use of a powerful laser pulse delivery into the liquid surrounding a mechanically distended tire (see publication WO 97/44171 of International Application PCT/UA96/00011). In that case, rubber becomes fragile at the room temperature and separated completely from metal cord, which can be easily utilized metallurgically.

However, the coefficient of efficiency of such a process is hardly in excess of 1% because of low (usually no more than 5%) efficiency of lasers, which precludes its use in practice.

Therefore, such methods and means are preferable for recycling tires, especially those with metal cord, that do not require any preliminary separation of rubber and cord wires and allow a set of commercial valuable secondary products to be obtained out of waste rubber, and utilize cord wires practically with no additional processing.

Most of such processes are based on the low-temperature (no more than 500° C., usually within a range of 200 to 400° C.) catalytic pyrolysis of waste rubber and only require cutting tires, including big tires with metal cord, into several large pieces.

Parameters, in particular temperature and pressure, and results of the catalytic pyrolysis of waste rubber depend greatly on the catalysts used. A critical index of their quality is activity that can be evaluated by their specific consumption per mass unit of the waste pyrolyzed, by minimal allowable temperature and pressure of the pyrolysis, by a degree of the polymer organic component conversion into low-molecular products, by a qualitative composition of such products, by their proportions in the mixture, and by their suitability for any subsequent use (with their minimal possible, or with no, additional processing prior to sale).

For example, U.S. Pat. No. 3,996,022 discloses a catalyst for the pyrolysis in a form of a fusion of halides, for example zinc chloride and stannum chloride. At a temperature of above 300° C. and a positive pressure, it ensures the transformation of waste rubber into a mixture of gaseous hydrocarbons, low-sulfur motor fuel and solid carbon residue.

However, the specific consumption of such catalyst is rather high, the process of its usage runs under sufficiently strict conditions, and the solid residue, which is produced in a great amount, is only suitable as a substitute for domestic coal, and can only be removed with difficulty out of the pyrolysis apparatus.

Similar results are obtained with the use of a powdery catalyst based on an iron compound (usually an oxide) with an auxiliary metal compounds of the Periodic Table, Group IV (Cr, Mo, W, Se, Te) in the process of pyrolysis of a mixture of hydrocarbon fuel and crushed waste rubber in the presence of hydrogen at a temperature of 350 to 500° C. and a pressure of 10 to 30 MPa (U.S. Pat. No. 4,251,500; JP Patent 52-125088).

At that, the achievement of a certain reduction in the solid residue amount and an increase in the motor fuel produced is associated with the need for specific safety measures against fire and explosion.

A catalyst-for the waste rubber pyrolysis, disclosed in U.S. Pat. No. 5,286,374, is made of mica such as muscovite, sericite and biotite. It allows the process of pyrolysis of worn metal-cord tires to be led at a reaction temperature of 230 to 400° C. under a pressure of 1.0–2.5 atmospheres.

Such a catalyst allows gaseous hydrocarbons, a wide range of liquid fuels, carbon black and a small amount of solid carbon residue, predominantly on cord wires, suitable for utilization as a metallurgical raw material to be produced in the absence of hydrogen, that is under significantly safer conditions.

However, its consumption rate amounts 2 to 3% of the initial rubber mass, whereas a total output of solid products of the pyrolysis reaches 43%. At that, carbon black comprising only a part of these products is markedly contaminated with an admixture of the catalyst, which hampers its utilization.

A catalyst disclosed in UA Patent No. 10442 is the closest prior art for the proposed catalyst. It is produced as a product of the gaseous carbon oxide decomposition over iron scale and, in essence, represents a homogenous iron-carbon composition material in the form of ultra-dispersed iron particles and microscopic carbon particles. This catalyst, hereinafter referred to as "iron-carbon component", is added into hydrocarbon solvents of the used machine oil type in an amount of no less than 0.2%, and preferably from 0.5 to 1.0% of solvent's mass. Waste rubber materials are left in this mixture till they swelled no less than 1.1 times, an excess of the solvent with the catalyst admixed is decanted for repeated use, while the waste rubber materials swelled are exposed to the pyrolysis at a temperature of 150 to 450° C., preferably near 200° C., in nitrogen current.

Consequently, the specific consumption rate of this catalyst amounts to 0,002–0.005% of the rubber mass. As a result, free-of-admixtures solid products of the pyrolysis in the form of carbon black with specific surface of 80 to 100 $m^2/g$ are suitable for the production of new general mechanical rubber goods, at least in the mixture of 50/50 with fresh carbon black.

However, the entire condensate of liquid products of the pyrolysis produced with a use of the catalyst described constitutes, in essence, black oil fuel having a boiling onset temperature of over 150° C., a boiling end temperature of near 400° C. and a flash temperature of over 100° C., which contains over 90% of paraffin-like hydrocarbons with the chain length of above $C_5$. Besides, in the case of using the catalyst described, the bound sulfur contents in the pyrolysis products not infrequently are below 1.0%. These undesirable results can be explained by still insufficiently high activity of the powdery catalyst in reactions of destructing the macromolecules containing hydrogen and carbon.

BRIEF DESCRIPTION OF THE INVENTION

So then, the aim of the present invention is to provide, by means of the improvement in its content, a more active catalyst capable of facilitating both the condensate enrichment with light hydrocarbon fractions and the practically complete binding of sulfur in the pyrolysis products under processes of the pyrolysis of hydrocarbon-containing polymer materials.

This aim is achieved by the solution, according to which a catalyst for the low-temperature pyrolysis of hydrocarbon-containing polymer materials which comprises an iron-carbon component in the form of microscopic carbon particles and ultra-dispersed iron particles, according to this invention, further comprises a metal-carbon component, which is obtained as a product of the stripping and the pyrolysis of a dispersion containing at least one salt of metals from the group VIII in the periodic table which is capable of decay upon heating in order to form an oxide, wherein said metal is selected from the group composed of iron, nickel and cobalt; as well as a carbohydrate and a highly volatile solvent.

The said complex catalyst, as compared with the known catalyst in the form of single iron-carbon component, possesses higher activity in the processes of low-temperature pyrolysis of hydrocarbon-containing polymer materials and, particularly, waste rubber in the form of metal-cord tires, which is confirmed by:

- a substantial—down to 70° C.—decrease in the boiling onset temperature of the condensate obtained by the pyrolysis;
- the recovery within a boiling temperature range of 70 to 300° C. of volatile, preferably straight $C_3$–$C_9$ and aromatic hydrocarbons, whose mixture not infrequently amounts to above 50% of the total condensate mass;
- the black-oil-fuel-like fraction output of 40 to 45% of the total condensate mass;
- the transformation into condensate up to 95–96% of the initial polymer mass;
- the practically complete chemical binding of sulfur present in the rubber within the pyrolysis products; and
- the possibility of obtaining black carbon with specific surface of up to 120 $m^2/g$.

The first supplemental difference consists in the fact that the iron-carbon component and the said metal-carbon component are taken in the following proportion (in percent by mass):

iron-carbon component 70–98 metal-carbon component 2–30

This allows the optimization to be reached in such a significant catalyst quality parameter as its specific surface, which makes up to no less than 80 $m^2/g$ and preferably is within a range of 110–120 $m^2/g$.

The second supplemental difference consists in the fact that said metal-carbon component is obtained as a product of the stripping and the pyrolysis of a dispersion, which, along with at least one salt of metals from the group VIII in the periodic table which is capable of decay upon heating in order to form an oxide, wherein said metal is selected from the group composing iron, nickel and cobalt, as well as a carbohydrate and a highly volatile solvent, contains an iron-carbon component which was obtained preliminary. The resulting complex catalyst is characterized by the most uniform distribution of the iron- and metal-carbon components in mixture and thereby ensures a rise in the condensate output counting upon the organic part of rubber at the pyrolysis temperature of no more than 250° C.

The third supplemental difference consists in the fact that the metal-carbon component is a product of the stripping and the pyrolysis of a dispersion containing an iron salt, a carbohydrate and a highly volatile solvent. Iron is the most accessible metal among metals from the VIII group in the periodic table. Therefore, the catalyst according to this invention occurs to be most acceptable judging from both the production cost for manufacturers and the price for consumers.

The fourth supplemental difference consists in the fact that the metal-carbon component is a product of the stripping and the pyrolysis of a dispersion containing an iron salt, a carbohydrate selected from group consisting of mono- and disaccharides, and a highly volatile solvent. Mono- and disaccharides are accessible and pyrolyzed readily to ultra-dispersed carbon black, which allows the metal-carbon component of the proposed catalyst to be produced both cheaply and effectively.

The fifth supplemental difference consists in the fact that the metal-carbon component is a product of the stripping and the pyrolysis of a dispersion containing an iron salt, a water-soluble high-molecular carbohydrate selected from the group consisting of starch and water-soluble cellulose esters, and water as a highly-volatile solvent. The water dispersion containing such water-soluble polysaccharides proves to be most convenient to produce the metal-carbon component cheaply and with a high metal concentration.

The sixth supplemental difference consists in the fact that iron and carbon are present in the iron-carbon component in the following amounts (in mole-percent):

iron 1.35–46.15 carbon 53.85–98.65

The seventh supplemental difference consists in the fact that iron and carbon are present in the metal-carbon component in the following amounts (in mole-percent):

iron 0.22–2.33 carbon 97.67–99.78

The eighth supplemental difference consists in the fact that iron is present in the catalyst in the form of particles sized 50 to 8,000 Å.

The indicated proportions of iron/carbon and the range of allowable iron particle sizes facilitate a valuable advantage of the catalyst proposed. An essential part of iron is present in the catalyst according to this invention in the form of clusters, which causes said improvement in its activity.

Naturally, the forms of implementing the concept of invention are restricted neither by the above-indicated versions nor by the examples below. Based on the principal technical solution that has been formulated above, other catalysts for the low-temperature pyrolysis of hydrocarbon-containing polymer materials can be developed by those skilled in the art, which are within the true scope and spirit of the invention.

PREFERRED EMBODIMENTS OF THE INVENTION

Further, the invention essence is explained by a list of the required initial materials and by the description of a method for the production of the catalyst proposed, examples of its composition and usage in the pyrolysis of waste rubber in the form of worn metal-cord tires, and by the data about efficacy of such a usage.

The catalyst of this invention represents a mixture of the iron- and metal-carbon components, which can be obtained as follows.

Whichever will be the method of blending, the iron-carbon component is to be produced first. For that purpose, a weight of fine-dispersed ferric oxide or iron salt which can be decomposed by heat to form an oxide is taken in a crucible and heated up to a temperature of 500 to 600° C. The ferric oxide is kept at this temperature in the current of a CO-containing gas with admixed hydrogen or hydrogen-containing components, such as water vapors. At that, there occur the following processes:

a) recovering and accompanying dispersing of iron, and b) so called Bell-Buduar reaction $2CO=CO_2+C$ catalyzed by juvenile surface of iron particles, which results in the formation of carbon in the form of microscopic particles.

An "iron/carbon" ratio is controlled by the exposure duration within ranges of (in mole-percent) 1.35–46.15 for iron and 53.85–98.65 for carbon. The longer exposure is, the less mole proportion of iron and the more mole proportion of carbon will be in the iron-carbon component that is obtained as a semiproduct or an intermediate product. In case of an excessive exposure, the CO decomposition ceases spontaneously because of the iron dispersing to ultra-dispersed particles whose surfaces are blocked completely by microscopic carbon particles, and reducing of the iron catalytic activity in Bell-Buduar reaction practically to zero.

In the iron-carbon component so obtained, iron particles are sized from some hundredth to some tenth parts of micrometer, while those of carbon from some tenth parts of micrometer to several tens of micrometers. The iron-carbon component can contain such trace admixtures as ferric carbides and oxygen, with the latter being usually present in the form of secondary or unreacted iron oxides and, partly, in sorbate state.

In the simplest case, the metal-carbon component can be produced independently of the iron-carbon component. For that purpose, the dispersion is firstly prepared by the known method, i.e. by dosing and mixing, which, if necessary, can be carried out as the concurrent or successive triturating of solid ingredients in a liquid disperse medium, at that said dispersion being in the form of a solution or a suspension contains:

as a dispersed phase:
at least one salt of metals from the group VIII in the periodic table which is capable of decay upon heating in order to form an oxide, wherein said metal is selected from the group consisting of iron, nickel and cobalt, and
an appropriate carbohydrate—reducer, and
a highly volatile solvent free of possible catalytic toxins as a disperse medium.

Examples of salts of the indicated type can be found preferably among formates and acetates as well as propionates and citrates of iron, cobalt and nickel. For those skilled in the art, it must be obvious that the use of other salts of mono-, di- and tricarboxylic acids is not excluded as well as nitrates and nitrites of said metals.

Carbonhydrate—reducers can be exemplified by:
monosaccharides, such as glucose, fructose and other aldoses and ketoses;
disaccharides, such as L- or D-sucrose, maltose, lactose, various glycoside-glucoses, glycoside-aldoses and glycoside-ketoses;
preferably such water-soluble polysaccharides or their derivatives, as vegetable starch and water-soluble cellulose esters of the methyl- or carboxymethylcellulose type.

Volatile solvents can be exemplified by the lower aliphatic alcohols used in preparing suspensions (sols), and preferably by distilled water, which is used usually in preparing true solutions or gels of reagents, selected for the production of the metal-carbon component under this invention.

The suspension prepared is concentrated by evaporation in an inert atmosphere until dry (possibly, under vacuum and/or at a higher temperature) and pyrolyzed in an inert atmosphere too with the stepped heating and an exposure at each stage, i.e.:

the dry residue is heated up to the temperature of caramelization, within a range of 190–200° C., and kept at this temperature for about 2 hours to decompose a selected salt and to transform its partially into a respective oxide (or a mixture of oxides) of a chosen metal;

the mass caramelized is heated up to a temperature of about 400° C. and kept at this temperature for about 1 hour to transform finally a selected salt into a respective oxide (or a mixture of oxides) of a chosen metal, to subject a chosen carbohydrate to the pyrolysis with the formation of microscopic particles of carbon, and to start recovering of an oxide (or a mixture of oxides) with the formation of ultra-dispersed particles of a metal;

the residue is heated up to a temperature within a range of 550–650° C. and kept at this temperature for about 1 hour to obtain the metal-carbon component, in which a metal (nickel, cobalt and, preferably, iron, as is the case in the iron-carbon component, or a mixture of all or some of them) and carbon are present in the following amounts (in mole-percent):

metal 0.22–2.33
carbon 97.67–99.78.

A "metal/carbon" ratio in the metal-carbon component is controlled by changing an amount of the metal source, that is of a selected salt(s), and an amount of the carbon source, that is of a selected carbohydrate (and, in a certain degree, a selected alcohol when alcohols are used as a disperse medium), in the dispersion prepared.

After cooling the metal-carbon component is mixed with the previously obtained iron-carbon component in a desired ratio.

Another, more preferable method for the new catalyst production provides for the preparation of a premixture by the introduction of the previously obtained iron-carbon component into a dispersion for preparing the metal-carbon component and the treatment, i.e. evaporation and pyrolysis, of this premixture, as above indicated. This method ensures a substantial simplification of the mixture homogenization and a stabilized value of specific surface in various catalyst lots with the same ratio between the iron- and metal-carbon components. Respectively, the processes of pyrolysis run more stably, and the composition and quality of target products of the recycling waste rubber become stabilized.

To determine an optimal ratio of the indicated components in the new catalyst, their mixtures were prepared with different proportions of the metal-carbon component in the total catalyst mass, and specific surface values were measured for each of them by the method known to those skilled in the art (see Table 1).

TABLE 1

Relationship between specific surface of the catalyst according to the invention and the metal-carbon component proportion in its mass

| Metal-carbon component proportion in the total catalyst mass, % | Specific surface of the catalyst, $m^2/g$ |
|---|---|
| 50 | 30 |
| 40 | 38 |
| 30 | 80 |
| 20 | 96 |
| 10 | 110 |
| 5 | 120 |
| 2 | 100 |
| 1 | 100 |

As can be seen from Table 1, specific surface of the new catalyst first grows up very rapidly as a proportion of the metal-carbon component lowers in the total catalyst mass, when a ratio of 60/40 between the iron- and metal-carbon components changes; for 70/30, reaches its maximum at a ratio of 95/5, and at a ratio of 98/2 it lowers and stabilizes.

Therefore, despite a total growth in activity of the catalyst under this invention owing to using the metal-carbon component, it is desirable that the iron- and metal-carbon components were present in the mixture in the following amounts (in percent by mass):

iron-carbon component 70–98 metal-carbon component 2–30.

As was shown by means of electron microscope studying, iron in the finished catalyst according to this invention is present in the form of particles sized 50 to 8,000 Å, and preferably 50 to 500 Å.

To test efficacy of the new catalyst, there were carried out:

a) the model experiments to assess its activity in the low-temperature hydrogen para-ortho-conversion by the scheme:

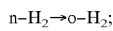

$n-H_2 \rightarrow o-H_2;$ b) the pilot experiments to assess its activity in the low-temperature pyrolysis of waste rubber, which are described below as examples.

Experiments of the (a) type have shown that the highest (75%) yield of o-hydrogen, when using the catalyst according to this invention, is already reached at a temperature of 45–46° C., whereas for the most active classic catalyst of $H_2$ para-ortho-conversion, known as Reney' Nickel, similar maximum is only reached at about 140° C.

The new catalyst reveals activity even at negative temperatures. Moreover, the studies on products of $H_2$ para-ortho-conversion with deuterium added have shown the presence of HD molecules, which indicates the breakage of bonds within $H_2$ molecules with the subsequent turning of the second atom into the orthoposition. Such an activity of the new catalyst is connected with the distinctive features of its structure, in which the metal-carbon "complexes" play a role of the active centers.

Experiments of the (b) type have been carried out using metal-cord tires as waste rubber materials. The tires were cut transversely into pieces of about 10 cm in width. With the purpose of swelling, these pieces were previously soaked in a liquid mixture of hydrocarbons and the catalyst according to this invention. Volume of this mixture was 3-fold that of tire pieces. Following the tire pieces swelled no less than 1.1 times, they were removed out of the mixture of hydrocarbons and the catalyst, and kept in air till drops of the said mixture trickled down. Then, they were placed in a container, transferred into a muffle oven and exposed to pyrolysis in dry nitrogen current, out of which the condensate was taken away in a water-cooled condenser for subsequent analysis. A residue of the mixture of hydrocarbons and the catalyst, poured off the tire pieces, was used in subsequent experiments.

EXAMPLE 1

For rubber swelling black fuel oil was used with 0.5% by mass of the catalyst added, whose ratio of the iron- to metal-carbon components was 85/15. The pyrolysis was carried out at a temperature of about 400° C. for 12 hours. The condensate obtained comprised (in percent by mass):

light hydrocarbons $C_3$–$C_9$ 5.2 volatile aromatic compounds (benzene, toluene) 3.8 oil-like mixture of hydrocarbons 91.0

At that, 92.0% by mass of the rubber organic compounds were transferred into the condensate, whereas sulfur was transferred into the oil-like mixture of hydrocarbons almost completely.

EXAMPLE 2

For rubber swelling spent oil was used poured off crank cases of vehicle motors with 0.3% by mass of the catalyst added, whose ratio of the iron- to metal-carbon components was 90/10. The pyrolysis was carried out at a temperature of about 300° C. for 12.5 hours. The condensate obtained comprised (in percent by mass):

light hydrocarbons $C_3$–$_9$ 7.4 volatile aromatic compounds (benzene, toluene) 11.3 oil-like mixture of hydrocarbons 81.3

At that, 94.0% by mass of the rubber organic compounds were transferred into the condensate, whereas sulfur, as before, was transferred into the oil-like mixture of hydrocarbons almost completely.

EXAMPLE 3

For rubber swelling a mixture was used comprising (in percent by mass) 90% of spent oil poured off crank cases of vehicle motors and 10% of diesel oil with 0.5% of additive in relation to total hydrocarbon mass of the catalyst, whose ratio of the iron- to metal-carbon components was 90/10. The pyrolysis was carried out at a temperature of about 250° C. for 12 hours. The condensate obtained comprised (in percent by mass):

light hydrocarbons $C_3$–$_9$ 19.6 volatile aromatic compounds (benzene, toluene) 25.8 oil-like mixture of hydrocarbons 54.6

At that, 95.0% by mass of the rubber organic compounds were transferred into the condensate, whereas sulfur, as before, was transferred into the oil-like mixture of hydrocarbons almost completely.

A series of similar experiments with and without using the new catalyst, whose ratio of the iron- to metal-carbon components was 90/10, at different temperatures of pyrolysis has shown that, under certain conditions, up to 96% by mass of the swelled rubber organics could be transferred into the condensate (see Table 2).

TABLE 2

Condensate yields in relation to mass of the swelled rubber organics for pyrolysis with the catalyst according to this invention, comprising 10% of the metal-carbon component

| Catalyst added % | Condensate yield % | Pyrolysis temperature ° C. |
|---|---|---|
| 0 | 20 | 700 |
| 0.2 | 87 | 350 |
| 0.3 | 94 | 300 |
| 0.5 | 95 | 250 |
| 1.0 | 96 | 250 |

INDUSTRIAL APPLICABILITY

Provided that an average size of carbon particles amounts to some tenth parts of $\mu$m, that of metal particles some hundredth parts of $\mu$m, and specific surface of the powdery catalyst of about 100 m$^2$/g and more, the amount of necessary catalytic additive comprises 0.2 to 0.5% by mass of the organic liquid used for swelling, in which the preliminary processing of waste rubber does take place. The combination of swelling with catalytic action of the high-active powdery catalyst allows the pyrolysis to be carried out at temperatures of 250 to 400° C. and the atmospheric pressure.

What is claimed is:

1. A catalyst for the low-temperature pyrolysis of hydrocarbon-containing polymer materials, which catalyst comprises an iron-carbon component in the form of microscopic carbon particles and ultra-dispersed iron particles, wherein said catalyst further comprises a metal-carbon component obtained as a product of the stripping and the pyrolysis of a dispersion that contains: a) at least one salt of metals from the group VIII in the periodic table which is capable of decay upon heating in order to form an oxide, wherein said metal is selected from the group consisting of iron, nickel and cobalt; b) a carbohydrate; and c) a highly volatile solvent.

2. A catalyst according to claim 1, wherein said iron-carbon and metal-carbon components are taken in the following proportions (in percent by mass):

iron-carbon component 70–98 metal-carbon component 2–30.

3. A catalyst according to claim 1, wherein said metal-carbon component is obtained as a product of the stripping and the pyrolysis of the dispersion which further contains an iron-carbon component.

4. A catalyst according to claim 1, wherein said metal-carbon component is a product of the stripping and the pyrolysis of the dispersion which contains an iron salt, a carbohydrate and a highly volatile solvent.

5. A catalyst according to claim 4, wherein said metal-carbon component is a product of the stripping and the pyrolysis of the dispersion which contains an iron salt, a carbohydrate selected of the group consisting of mono- and disaccharides, and a highly volatile solvent.

6. A catalyst according to claim 5, wherein said metal-carbon component is a product of the stripping and the pyrolysis of the dispersion which contains an iron salt, a water-soluble high-molecular carbohydrate selected of the group consisting of starch and water-soluble cellulose esters, and water as a highly volatile solvent.

7. A catalyst according to claim 6, wherein iron and carbon are present in said iron-carbon component in the following amounts (in mole-percent):

iron 1.35–46.15 carbon 53.85–98.65.

8. A catalyst according to claim 6, wherein iron and carbon are present in said metal-carbon component in the following amounts (in mole-percent):

iron 0.22–2.33 carbon 97.67–99.78.

9. A catalyst according to claim 1, wherein iron is present in said catalyst in the form of particles sized 50 to 8,000 Å.

* * * * *